United States Patent
Pearce et al.

(10) Patent No.: US 9,939,527 B2
(45) Date of Patent: Apr. 10, 2018

(54) SUBSEA MEASUREMENT SYSTEM AND METHOD OF DETERMINING A SUBSEA LOCATION-RELATED PARAMETER

(75) Inventors: Christopher Pearce, Hampshire (GB); Mikael Larsen, Hornbaek (DK); David Lawes, Hampshire (GB)

(73) Assignee: Sonardyne International Limited, Yately, Hampshire (GB)

( * ) Notice: Subject to any disclaimer, the term of this patent is extended or adjusted under 35 U.S.C. 154(b) by 1137 days.

(21) Appl. No.: 13/144,288

(22) PCT Filed: Jan. 12, 2010

(86) PCT No.: PCT/GB2010/050038
§ 371 (c)(1),
(2), (4) Date: Feb. 1, 2012

(87) PCT Pub. No.: WO2010/079366
PCT Pub. Date: Jul. 15, 2010

(65) Prior Publication Data
US 2012/0134236 A1    May 31, 2012

(30) Foreign Application Priority Data

Jan. 12, 2009  (GB) .................................. 0900390.6

(51) Int. Cl.
*G01S 3/80* (2006.01)
*G01S 15/87* (2006.01)
*G01S 15/46* (2006.01)

(52) U.S. Cl.
CPC .......... *G01S 15/874* (2013.01); *G01S 15/872* (2013.01); *G01S 2015/465* (2013.01)

(58) Field of Classification Search
CPC ... G01C 9/00; G01C 9/02; G01C 9/04; G01C 9/06; G05D 1/08; G01S 15/872; G01S 15/874; G01S 2015/465

(Continued)

(56) References Cited

U.S. PATENT DOCUMENTS 3,025,520 A * 3/1962 Werner et al. ................ 342/394
3,996,590 A * 12/1976 Hammack .................... 342/465
(Continued)

FOREIGN PATENT DOCUMENTS

| BR | PI0805633 A2 * | 9/2010 | ............ E21B 17/01 |
|---|---|---|---|
| GB | 1285697 | 8/1972 | |
| GB | 2125965 | 3/1984 | |

OTHER PUBLICATIONS

Niemeijer, Reint, PCT International Search Report, European Patent Office, dated May 26, 2010, 4 pages.

*Primary Examiner* — Isam A Alsomiri
*Assistant Examiner* — Amie M Ndure
(74) *Attorney, Agent, or Firm* — Bracewell LLP; Keith R. Derrington

(57) ABSTRACT

A subsea measurement system (400) comprises a first reference beacon (110) disposed at a first known location, a second reference beacon (112) disposed at a second known location, and an acoustic communications module (302) for coupling to a subsea element to be monitored. The acoustic communications module (302) is capable of moving, when in use, relative to the first reference beacon (110) and the second reference beacon (112). The acoustic communications module (302) also comprises a processing resource and is arranged to determine first range-related data to the first reference beacon (110) in response to receipt of a first signal by the acoustic communications module (302) from the first reference beacon (110) and second range-related data to the second reference beacon (112) in response to receipt by the acoustic communication module (302) of a second signal from the second reference beacon (112).

14 Claims, 6 Drawing Sheets

(58) Field of Classification Search
USPC .............. 257/E45.002; 367/130, 19, 6, 96; 438/287, 381
See application file for complete search history.

(56) References Cited

U.S. PATENT DOCUMENTS

| | | | |
|---|---|---|---|
| 4,635,236 A | | 1/1987 | Roberts |
| 5,784,339 A | * | 7/1998 | Woodsum et al. ............ 367/134 |
| 6,062,769 A | * | 5/2000 | Cunningham ............. 405/195.1 |
| 6,668,218 B1 | * | 12/2003 | Bulow et al. ................... 701/21 |
| 2004/0056779 A1 | * | 3/2004 | Rast ............................... 340/985 |
| 2005/0249667 A1 | * | 11/2005 | Tuszynski et al. ............ 424/9.3 |
| 2006/0065401 A1 | * | 3/2006 | Allen et al. .................... 166/345 |
| 2006/0178829 A1 | * | 8/2006 | Gaiffe .................. G01S 3/8083 701/469 |
| 2006/0250894 A1 | | 11/2006 | Alliot |
| 2008/0037370 A1 | * | 2/2008 | Crowell .................... G01S 5/30 367/127 |
| 2008/0223583 A1 | * | 9/2008 | Roveri et al. ................. 166/336 |
| 2009/0184715 A1 | * | 7/2009 | Summerfield et al. ....... 324/334 |
| 2009/0196122 A1 | * | 8/2009 | Crowell .................... G01S 5/30 367/127 |
| 2009/0231953 A1 | * | 9/2009 | Welker et al. .................. 367/19 |
| 2009/0287414 A1 | * | 11/2009 | Vickery ........................ 701/220 |
| 2009/0316526 A1 | * | 12/2009 | Grall ............................... 367/20 |
| 2011/0038230 A1 | * | 2/2011 | Napolitano .............. G01S 1/80 367/127 |

\* cited by examiner

SUBSEA MEASUREMENT SYSTEM AND METHOD OF DETERMINING A SUBSEA LOCATION-RELATED PARAMETER

RELATED APPLICATION

This application claims priority to PCT application PCT/GB2010/050038 filed Jan. 12, 2010, which claimed priority to British patent applications GB 0900390.6 filed Jan. 12, 2009.

The present invention relates to a subsea measurement apparatus of the type that, for example, determines a range and bearing in relation to a beacon. The present invention also relates to a method of determining a subsea location-related parameter, the method being of the type that, for example, determines a range and bearing in relation to a beacon.

Systems such as an offshore mooring system used in the field of oil and gas production, are large and complex. They have a design life measured in decades and they have to withstand loading introduced by extreme weather conditions. Structural failure of any component within the system may have serious fiscal, safety and environmental consequences. To improve the understanding of the mechanical loads within this type of system, it is critical that the motions of components within the mooring system are monitored by a monitoring system.

Typically, the parameters that need to be measured in respect of a component of the mooring system include: X, Y, Z displacement time series compared to an origin mean or some fixed reference, velocity time series, an acceleration time series and/or a rotations/attitude (roll, pitch and heading) time series. Ideally, it is desirable to measure additional parameters in respect of the component of the mooring system, such as water current in the vicinity of the component, pressure depth, temperature and/or inclination.

A given component of the mooring system may be anywhere in a so-called "water column" and therefore no part of the structure of the mooring system is necessarily above the surface of the sea. Therefore, surface navigation systems, such as a Global Satellite Navigation System (GNSS), are of little or no use. For practical reasons, monitoring systems are typically self-powered and operate largely in an autonomous fashion. The intervals between servicing by remotely operated vehicles are typically 6 months or more. Therefore, the energy efficiency of the monitoring system is important. However, there does not exist a large number of suitable technologies upon which to base the monitoring system. In this regard, suitable technologies include: inertial sensors, an acoustic position system or a combination thereof.

Typically, the components of the mooring system to be monitored are large mechanical systems and the period of the motion to be monitored can be up to 150 seconds, or more, and the amplitude of the motions can vary between a few meters or tens of meters. The magnitude of the acceleration of a given component being monitored can be in the order of a few milli-g. If roll and pitch is measured using simple inclinometers, distortion in the gravity vector introduces an error of about 0.1 degrees, and in any event inclinometers do not produce heading information. However, in order to monitor motion of the component of the mooring system adequately, displacement measurement accuracy is typically required to be in the order of 0.1 m.

As an alternative to using simple inclinometers or accelerometers, a better solution is based on high grade inertial sensors, such as an Attitude and Heading Reference System (AHRS). Such a measurement system uses a gyrocompass algorithm to obtain roll, pitch and heading data in a north up local level frame, but it also estimates heave surge and sway in the so-called "platform frame". The heave surge and sway calculation is based upon an assumption that the displacement of the component to be monitored is mean zero. However, the large period of motion of the component of the mooring system makes it difficult to realise practical sensors that are sufficiently accurate.

Another solution employs an Inertial Navigation System (INS) to compute displacement, velocity, acceleration and attitude. In normal circumstances, this solution can yield satisfactory results using a Zero Velocity Update (ZUPT) procedure, which defines initial conditions in respect of displacement, velocity and attitude. However, in the case of a structure in a mid-water position, this aiding method can not be used. It is possible to supplement the INS with an acoustic positioning system, which yields a sufficiently accurate solution, and indeed a number of suitable acoustic positioning systems exist that can be used to serve as an aiding input for the INS or as a stand alone system or a combination thereof. However, such a solution is costly in terms of power budget. Consequently, a very large battery pack is required to power a monitoring system that uses the INS/acoustic positioning system combination or the number of hours during which the INS can be used has to be limited in order to support a sufficiently long maintenance interval.

According to a first aspect of the present invention, there is provided a subsea measurement system comprising: a first reference beacon disposed at a first known location; a second reference beacon disposed at a second known location; and an acoustic communications module for coupling to a subsea element to be monitored, the acoustic communications module being capable of moving, when in use, relative to the first reference beacon and the second reference beacon; wherein the acoustic communications module comprises a processing resource and is arranged to determine first range-related data to the first reference beacon in response to receipt of a first signal by the acoustic communications module from the first reference beacon and second range-related data to the second reference beacon in response to receipt by the acoustic communication module of a second signal from the second reference beacon.

The acoustic communications module may be further arranged to determine first angle data to the first reference beacon in response to receipt of the first signal by the acoustic communications module from the first reference beacon and second angle data to the second reference beacon in response to receipt by the acoustic communication module of the second signal from the second reference beacon.

The first angle data may comprise a first direction cosine angle and a second direction cosine angle and/or the second angle data may comprise a third direction cosine angle and a fourth direction cosine angle.

The system may further comprise: another acoustic communications module for coupling to the subsea element to be monitored; the another acoustic communications module may be capable of moving, when in use, relative to the first reference beacon and the second reference beacon; wherein the another acoustic communications module may comprise another processing resource and may be arranged to determine third range-related data to the first reference beacon in response to receipt of the first signal by the another acoustic communications module from the first reference beacon and fourth range-related data to the second reference beacon in response to receipt by the another acoustic communication module of the second signal from the second reference beacon.

The another acoustic communications module may be further arranged to determine third angle data to the first reference beacon in response to receipt of the first signal by the acoustic communications module from the first reference beacon and fourth angle data to the second reference beacon in response to receipt by the acoustic communication module of the second signal from the second reference beacon.

The third angle data may comprise a fifth direction cosine angle and a sixth direction cosine angle and/or the fourth angle data may comprise a seventh direction cosine angle and a eighth direction cosine angle.

The system may further comprise: a further processing resource arranged to calculate at least one location-related parameter for the subsea element to be monitored.

The location-related parameter may be a position associated with the acoustic communications module.

The location-related parameter may be a heading associated with the acoustic communications module.

The location-related parameter may be a roll and/or pitch associated with the acoustic communications module.

The location-related parameter may be an attitude associated with the acoustic communications module.

The acoustic communications module may be capable of being coupled to or integrally formed with a subsea element.

The subsea element may be a buoyancy can.

The system may further comprise: a third reference beacon disposed at a third known location.

The acoustic communications module may be arranged to determine fifth range-related data from the acoustic communications module to the third beacon in response to receipt of a third signal by the acoustic communications module from the third reference beacon.

The acoustic communications module may be arranged to determine fifth angle data to the third reference beacon in response to receipt of the third signal by the acoustic communications module from the third reference beacon.

The system may further comprise an inertial sensor.

The system may further comprise an inclinometer.

The system may further comprise a temperature sensor.

The system may further comprise a depth sensor.

The first beacon and the second beacon may be respectively fixed at the first known location and the second known location.

The first and second beacons may be fixed to a seabed or a permanent fixture of a sea floor.

The first and second beacons may be acoustic beacons.

The acoustic communications module may be a USBL module.

The USBL module may comprise a plurality of spaced hydrophones.

The USBL module may comprise a transducer.

The USBL module may be a USBL transceiver.

The first beacon may be a first transponder and the second beacon may be a second transponder.

The first beacon may be removably mounted in a first mount and/or the second beacon may be removably mounted in a second mount.

The first mount and the second mount may be frames.

The another acoustic communications module may be another USBL module.

The acoustic communications module may be associated with a subsea element in order to measure motion of the subsea element.

The system may further comprise a water current measurement device.

The water current measurement device may be arranged to generate a velocity vector associated with a velocity of the water current measurement device. The water current measurement device may be a Doppler velocity log.

According to a second aspect of the present invention, there is provided a free standing hybrid riser (FSHR) apparatus comprising the subsea measurement system as set forth above in relation to the first aspect of the invention.

According to a third aspect of the present invention, there is provided a constellation of free standing hybrid riser apparatus for coupling to a floating production storage and offloading (FPSO) vessel comprising the free standing hybrid riser apparatus as set forth above in relation to the second aspect of the invention.

According to a fourth aspect of the present invention, there is provided a method of determining a subsea location-related parameter, the method comprising: disposing a first reference beacon at a first known location; and disposing a second reference beacon at a second known location; providing an acoustic communications module for coupling to a subsea element to be monitored, the acoustic communications module being capable of moving relative to the first reference beacon and the second reference beacon; and determining first range-related data from the acoustic communications module to the first reference beacon in response to receipt of a first signal by the acoustic communications module from the first beacon and second range-related data from the acoustic communications module to the second reference beacon in response to receipt by the acoustic communications module of a second signal from the second reference beacon.

It is thus possible to provide a system and method that minimise energy consumption, thereby prolonging battery life. Furthermore, it is possible to determine accurately both attitude and position of a component to be monitored, for example a buoyancy can, as well as high quality velocity, acceleration, roll, pitch and heading data. Also, update rates of between about 0.1 Hz and about 10 Hz, or more, and no prior assumption is required as to the nature of the motions of the buoyancy can.

Various advantages of the invention are also set out below in relation to the embodiments described. However, the skilled person should appreciate that these advantages are not confined to the embodiments described and are also applicable to any embodiment as set forth in the claims.

At least one embodiment of the invention will now be described, by way of example only, with reference to the accompanying drawings, in which.

Throughout the following description, identical reference numerals will be used to identify like parts.

Figure 1:
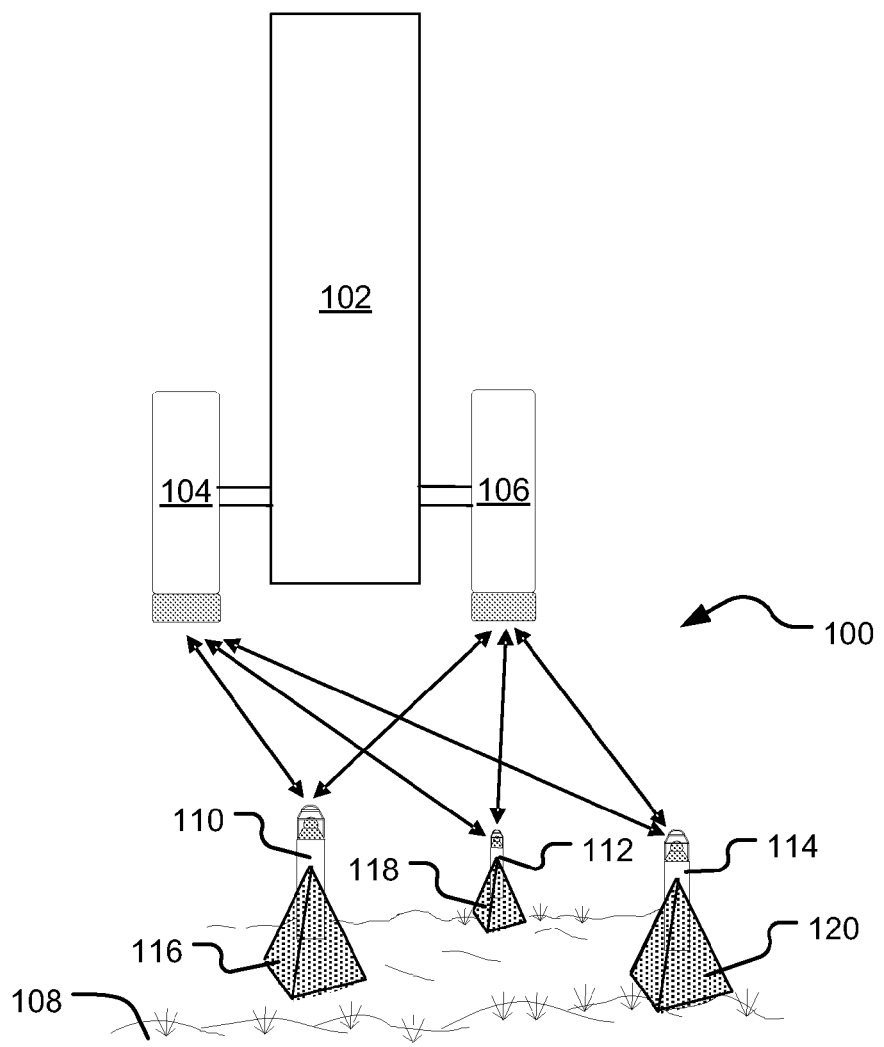
FIG. 1 is a schematic diagram of a subsea monitoring system constituting a first embodiment of the invention.

Referring to FIG. 1, a free standing hybrid riser (FHSR) or riser tower (not shown) for coupling to a floating production storage and offloading (FPSO) vessel of a subsea oil field is supported by a buoyancy can 102. Although not shown, the riser can be part of a constellation of free standing hybrid risers. A subsea measurement system 100 is employed in relation to the buoyancy can 102 in order to monitor motion of the buoyancy can 102 for comparison with a predicted motion in order to monitor fatigue of the riser tower with respect to predicted fatigue life. In this example, the buoyancy can 102 is an example of a subsea element. However, the skilled person should also appreciate that the riser is also an example of a subsea element.

In this embodiment, a first part of the subsea measurement system 100 comprises a first transponder 104, constituting an acoustic communications module, coupled to a first side of the buoyancy can 102 and a second transponder 106, constituting another acoustic communications module, coupled to a second side of the buoyancy can 102. Of course, if desired, the first and second transponders 104, 106 can be integrally formed with the buoyancy can 102. The first and second transponders 104, 106 are therefore located above a seabed 108. In this example, the first and second transponders 104, 106 are Autonomous Monitoring Transponders (AMTS) available from Sonardyne International Limited, UK. The first and second transponders 104, 106 each have a processing resource, internal batteries and respective internal memories to store range information or range-related data, for example time-of-flight data. Although not shown in FIG. 1, the first and second transponders 104, 106 include respective inclinometer sensors. As the inclinometer sensors measure the direction of a gravity vector relative to the first and second transponders 104, 106, respectively, the inclinometer sensors are affected by motion of the buoyancy can, causing errors in the region of 0.1°. Optionally, the first and second transponders 104, 106 can comprise a pressure sensor and a temperature sensor.

On the seabed 108 or a permanent fixture of a sea floor, a first beacon transponder 110 is located at a first known location, a second beacon transponder 112 is located at a second known location, and a third beacon transponder 114 is located at a third known location. The first, second and third beacon transponders 110, 112, 114 constitute reference beacons. In this regard, any suitable calibration technique can be employed to determine the locations of the first, second and third beacon transponders 110, 112, 114. In order to avoid unintentional displacement and facilitate replacement of the first, second and third beacon transponders 110, 112, 114, the first beacon transponder 110 is removably disposed in a first transponder frame 116, the second beacon transponder 112 is removably disposed in a second transponder frame 118, and the third beacon transponder 114 is removably disposed in a third transponder frame 120. In this example, the first, second and third beacon transponders 110, 112, 114 are wideband transponders, for example Type 8159 Wideband Transponders available from Sonardyne International Limited. The first, second and third transponder frames 116, 118, 120 can be any suitable transponder frames, for example a 10842-001 type frame available from Sonardyne International Limited, UK.

In operation, the first and second transponders 104, 106 operate autonomously. The first and second transponders 104, 106 send an interrogation signal to each of the first, second and third beacon transponders 110, 112, 114 and the processing resources of the first and second transponders 104, 106 perform a ranging function with respect to each of the first, second and third beacon transponders 110, 112, 114.

As the respective locations of the first and second transponders 104, 106 relative to the buoyancy can 102 are known, the first and transponders 104, 106 are equipped with respective inclinometers, and the respective locations of the first, second and third beacon transponders 110, 112, 114 are known, the ranges generated by the first and second transponders 104, 106 can be used to determine the location of the buoyancy can 102 using any suitable technique, for example trilateration. Additionally or alternatively, the subsea measurement system 100 can also estimate attitude associated with the buoyancy can 102 in three axes (roll, pitch and heading), which are examples of location-related parameters.

Although, in this example, three beacon transponders have been employed, the skilled person should appreciate that a greater or smaller number of beacon transponders can be employed, for example four beacon transponders, in order to increase accuracy.

As mentioned above, the beacon transponders 110, 112, 114 are mounted in frames to allow, inter alia, easy replacement, for example replacement by a Remotely Operated Vehicle (ROV). Similarly, the first and second transponders 104, 106 can be recovered by the ROV and replaced with spare transponders in order to access the data stored by the first and second transponders 104, 106.

In another embodiment (FIG. 2), the buoyancy can (not shown in FIG. 2) is coupled to another subsea measurement system 200. In this embodiment, the subsea measurement system 200 comprises a data acquisition and storage module 202 coupled to a battery module 204 that serves as a power supply. The data acquisition and storage module 202 constitutes a processing resource and is also coupled to a first Long Baseline (LBL) transceiver module 206, constituting an acoustic communications module, coupled to a first side of the buoyancy can, and a second LBL transceiver module 208, constituting another acoustic communications module, coupled to a second side of the buoyancy can. Any suitable LBL transceiver module can be employed. However, the AMT transponders mentioned above are configurable to function as transceivers, and so in this example, AMT transponders of the type mentioned above are used, but configured to operate as transceivers.

Figure 2:
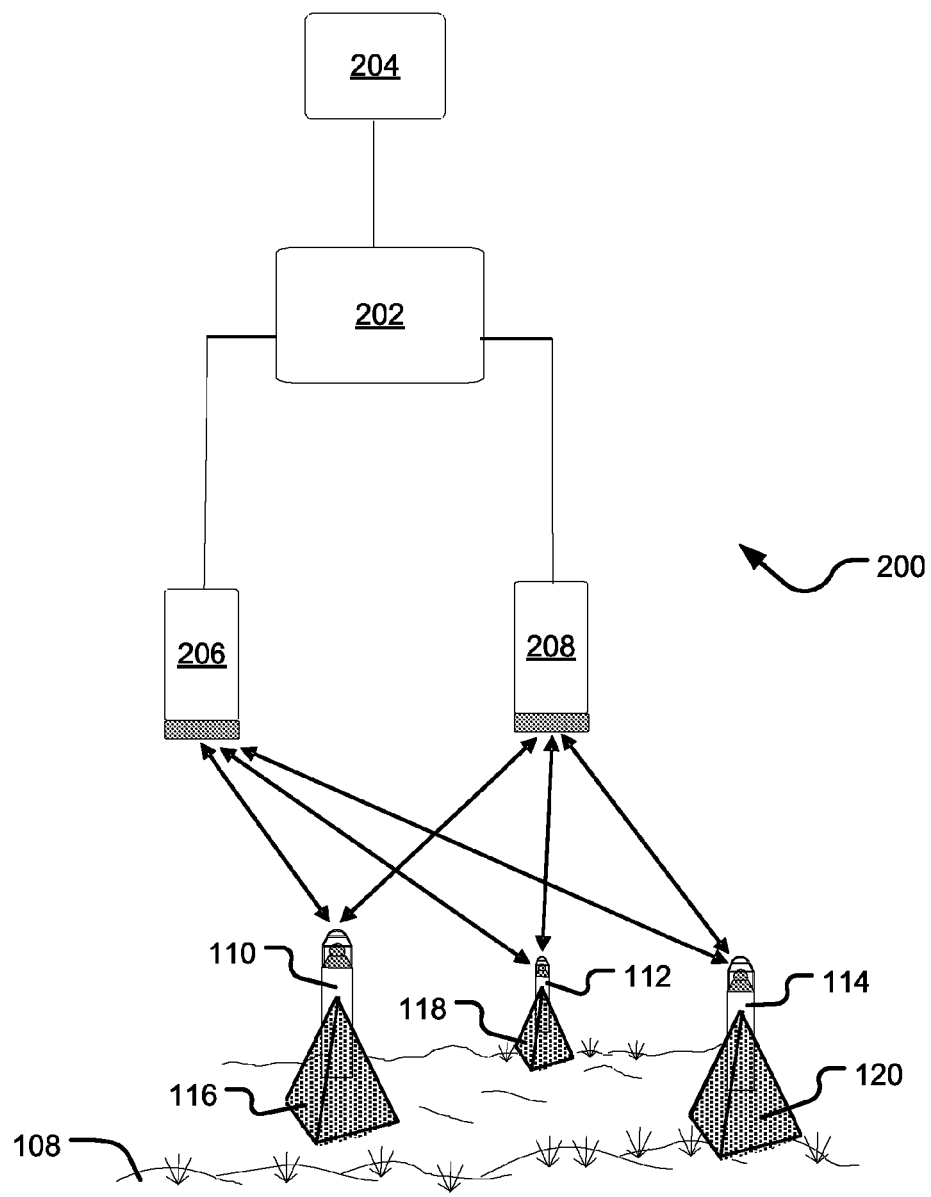
FIG. 2 is a schematic diagram of a subsea monitoring system constituting a second embodiment of the invention.

Although not shown in FIG. 2, the first and second LBL transceivers 206, 208 include respective inclinometer sensors. As the inclinometer sensors measure the direction of a gravity vector relative to the first and second LBL transceivers 206, 208, respectively, the inclinometer sensors are affected by motion of the buoyancy can, causing errors in the region of 0.1°. Optionally, the first and second LBL transceivers 206, 208 can comprise a pressure sensor and a temperature sensor.

On the seabed 108 or a permanent fixture of the sea floor, the first beacon transponder 110 is located at the first known location, the second beacon transponder 112 is located at the second known location, and the third beacon transponder 114 is located at the third known location. The first, second and third beacon transponders 110, 112, 114 constitute reference beacons. In this regard, any suitable calibration technique can be employed to determine the locations of the first, second and third beacon transponders 110, 112, 114. In order to avoid unintentional displacement and facilitate replacement of the first, second and third beacon transponders 110, 112, 114, the first beacon transponder 110 is removably disposed in the first transponder frame 116, the second beacon transponder 112 is removably disposed in the second transponder frame 118, and the third beacon transponder 114 is removably disposed in the third transponder frame 120. In this example, the first, second and third beacon transponders 110, 112, 114 are wideband transponders, for example Type 8159 Wideband Transponders available from Sonardyne International Limited. The first, second and third transponder frames 116, 118, 120 can be any suitable transponder frames, for example as available from Sonardyne International Limited, UK.

In operation, the first and second LBL transceivers 206, 208 are externally controlled by the data acquisition and storage module 202 and measure ranges or other range-related parameters, such as time-of-flight, with respect to the first, second and third beacon transponders 110, 112, 114, which are examples of a location-related parameter and respectively accurate to about 0.1 m. As the respective locations of the first and second transponders 104, 106 relative to the buoyancy can are known, the first and transponders 104, 106 are equipped with respective inclinometers, and the respective locations of the first, second and third beacon transponders 110, 112, 114 are known, the ranges generated can be used to determine the location of the buoyancy can 102 using any suitable known technique, for example a trilateration technique, for each of the first and second LBL transceivers 206, 208, which is an example of a location-related parameter and is accurate to about 0.1 m. Additionally or alternatively, the subsea measurement system 200 can also estimate attitude associated with the buoyancy can 102 in three axes (roll, pitch and heading), which are examples of location-related parameters.

Figure 3:
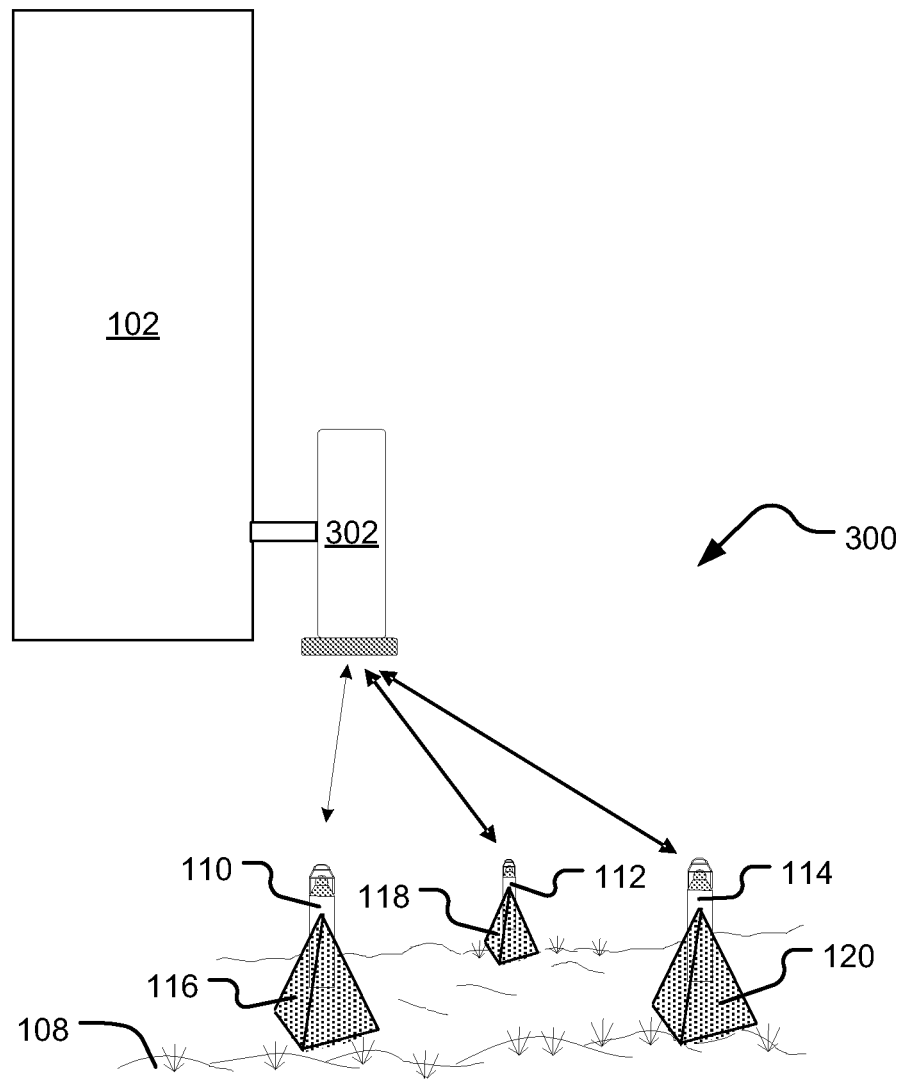
FIG. 3 is a schematic diagram of a subsea monitoring system constituting a third embodiment of the invention.

Turning to FIG. 3, in a further embodiment, the buoyancy can 102 is coupled to a first part of a further subsea measurement system 300. In this embodiment, the subsea measurement system 300 comprises an Ultra-Short Baseline (USBL) transceiver module 302 coupled to a side of the buoyancy can and constituting an acoustic communications module. Although not shown, the USBL transceiver module 302 comprises a processing resource, an internal battery and an internal memory operably coupled to the processing resource, As can be seen in FIG. 3, the USBL acoustic transceiver 302 is positioned close to or towards the base of the buoyancy can 102 in order to provide line-of-sight to all seabed transponders and avoid adverse acoustic performance caused by reflections from walls of the buoyancy can 102.

In this example, the USBL transceiver module 302 is a combination of an acoustic transceiver and an USBL receive array, for example a low power USBL transceiver module available from Sonardyne International Limited, UK. In this example, the USBL receive array is a plurality of spaced hydrophones. The USBL transceiver module 302 is a low power USBL transceiver module that comprises a mid-range Digital Signal Processor (DSP) processor, which uses little more energy than a single channel acoustic receiver.

On the seabed 108 or a permanent fixture of the sea floor, the first beacon transponder 110 is again located at the first known location, the second beacon transponder 112 is located at the second known location, and the third beacon transponder 114 is located at the third known location. The first, second and third beacon transponders 110, 112, 114 constitute reference beacons. In this regard, any suitable calibration technique can be employed to determine the locations of the first, second and third beacon transponders 110, 112, 114. In order to avoid unintentional displacement and facilitate replacement of the first, second and third beacon transponders 110, 112, 114, the first beacon transponder 110 is removably disposed in the first transponder frame 116, the second beacon transponder 112 is removably disposed in the second transponder frame 118, and the third beacon transponder 114 is removably disposed in the third transponder frame 120. In this example, the first, second and third beacon transponders 110, 112, 114 are wideband transponders, for example Type 8159 Wideband Transponders available from Sonardyne International Limited. The first, second and third transponder frames 116, 118, 120 can be any suitable transponder frames, for example a 10842-001 type frame available from Sonardyne International Limited.

The beacon transponders 110, 112, 114 are mounted in the frames to avoid unintentional displacement of the beacon transponders 110, 112, 114 and easy replacement thereof, for example replacement by the ROV. Similarly, the USBL transceiver module 302 can be recovered by the ROV and replaced with a spare USBL transceiver module 302 in order to access the data stored by the USBL transceiver module 302.

In order to minimise deployment costs associated with the first, second and third beacon transducers 110, 112, 114, the deployment thereof can take place at the same time as deployment of a Turret Buoy monitoring system and/or a Top Riser Assembly monitoring system.

In operation, during a measurement cycle, the USBL transceiver module 302 interrogates each of the first, second and third beacon transponders 110, 112, 114 and processes the replies received by the multiple elements of the receive array of the USBL transceiver module 302. The processed data from each beacon transponder is in the form of two angles constituting angle data, for example direction cosine angles, and a range or range-related data, for example time-of-flight data. When replies from three or more transponders are processed together, the subsea measurement system 300 can estimate position in three axes and attitude in three axes (roll, pitch and heading), which are examples of location-related parameters. There is also redundant information available to estimate bias errors in the system.

In order to conserve electrical power, the USBL transceiver module 302 is arranged, in this example, to "wake up" at predetermined intervals and initiate a set of measurements and store the data internally. In order to avoid interference with any Turret Buoy and Top Riser Assembly position monitoring systems, in this example the USBL transceiver module 302 and the beacon transponders 110, 112, 114 use different wake-up and positioning frequencies to those used by any Turret Buoy and Top Riser Assembly position monitoring systems.

Although not shown in FIG. 3, the USBL transceiver module 302 can optionally comprise sensors, for example an inclinometer, such as a dual-axis inclinometer, a temperature sensor and/or a depth sensor. Of course, if desired the optional sensors can be provided external to the housing of the USBL transceiver module 302. However, it is more convenient to include any optional sensors in the housing of the USBL transceiver module 302. Additionally, as accelerations at the base of the buoyancy can be less than at the top of the buoyancy can, in this example, any optional sensors are mounted in the housing of the USBL transceiver module 302. Additionally, or alternatively, the subsea measurement system can include other measurement devices, for example: a water current measurement device, such as a single point measurement device (for example a Seaguard® current meter available from Aanderaa Data Instruments AS, Norway) or a Doppler Velocity Log module (for example an apparatus from the Workhorse range of Acoustic Doppler Current Profilers available from Teledyne RD Instruments, Inc., USA). Attitude sensors are not required as attitude can be deduced from the acoustic measurements made above.

Although, in this example, three beacon transponders have been employed, the skilled person should appreciate that a greater or smaller number of beacon transponders can be employed, for example four beacon transponders, in order to increase accuracy. If a smaller number of beacon transponders is employed, the part of the system 100 comprising the USBL transceiver module 302 has to comprise another measurement device, for example the optional inclinometer mentioned above.

Advantageously, the subsea monitoring system 300 provides a relatively low cost way of monitoring the motion of the buoyancy can 102, whilst minimising energy consumption, thereby prolonging battery life. Furthermore, it is possible to determine accurately both attitude and position of the buoyancy can 102 from the acoustic measurements made, as well as high quality velocity, acceleration, roll, pitch and heading data. Even in deep water, the system can achieve update rates of between about 0.1 Hz and about 1 Hz and no prior assumption is required as to the nature of the motions of the buoyancy can 102.

Figure 4:
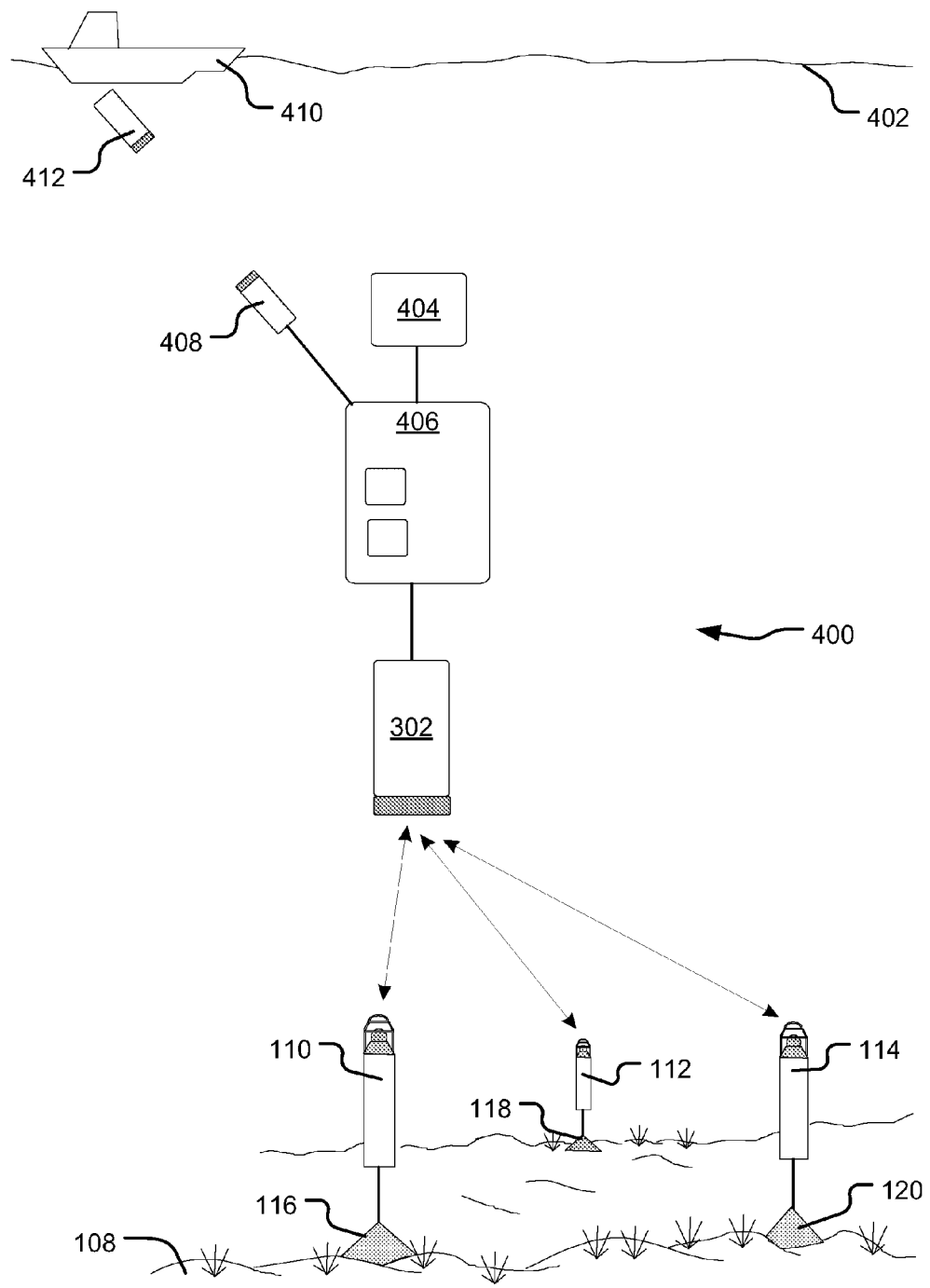
FIG. 4 is a schematic diagram of a subsea monitoring system constituting a fourth embodiment of the invention.

Referring to FIG. 4, in yet another embodiment, a subsea measurement system 400 is shown relative to the sea surface 402 and seabed 108. In this embodiment, the subsea measurement system 400 again comprises the USBL transceiver module 302, constituting the acoustic communications module, coupled to a side of the buoyancy can (not shown in FIG. 4). In this example, the USBL acoustic transceiver 302 is positioned close to or towards the base of the buoyancy can in order to provide line-of-sight to all seabed transponders and avoid adverse acoustic performance caused by reflections from walls of the buoyancy can 102.

In common with the previous embodiment, the USBL transceiver module 302 is a combination of an acoustic transceiver and an USBL receive array, for example a low power USBL transceiver module available from Sonardyne International Limited, UK. In this example, the USBL receive array is a plurality of spaced hydrophones. The USBL transceiver module 302 is a low power USBL transceiver module that comprises a mid-range Digital Signal Processor (DSP) processor, which uses little more energy than a single channel receiver.

A battery module 404 is provided and coupled to a data acquisition and storage module 406. The data acquisition and storage module 406 constitutes a processing resource and is coupled to the USBL transceiver module 302. In this example, the data acquisition and storage module 406 has a system control function comprising pre-programmed procedures that power the various sensors and drives them to acquire the data which is logged into memory of the data acquisition and storage module 406.

On the seabed 108 or a permanent fixture of the sea floor, as in relation to the previous embodiment, the first beacon transponder 110 is located at the first known location, the second beacon transponder 112 is located at the second known location, and the third beacon transponder 114 is located at the third known location. The first, second and third beacon transponders 110, 112, 114 constitute reference beacons. In this regard, any suitable calibration technique can be employed to determine the locations of the first, second and third beacon transponders 110, 112, 114. In order to avoid unintentional displacement and facilitate replacement of the first, second and third beacon transponders 110, 112, 114, the first beacon transponder 110 is removably disposed in the first transponder frame 116, the second beacon transponder 112 is removably disposed in the second transponder frame 118, and the third beacon transponder 114 is removably disposed in the third transponder frame 120. In this example, the first, second and third beacon transponders 110, 112, 114 are wideband transponders, for example Type 8159 Wideband Transponders available from Sonardyne International Limited. The first, second and third transponder frames 116, 118, 120 can be any suitable transponder frames, for example as available from Sonardyne International Limited.

The beacon transponders 110, 112, 114 are mounted in the frames to avoid unintentional displacement of the beacon transponders 110, 112, 114 and easy replacement thereof, for example replacement by the ROV. Similarly, the USBL transceiver module 302 can be recovered by the ROV and replaced with a spare USBL transceiver module 302 in order to access the data stored by the USBL transceiver module 302.

In order to communicate telemetry data from the subsea part of the subsea monitoring system 400 to a Floating Production, Storage and Offloading (FPSO) vessel 410, the subsea part of the subsea monitoring system 400 can comprise a first part of a robust spread spectrum or high speed acoustic telemetry link 408 and the FPSO vessel 410 can comprise a second part of the link 412. A suitable transceiver is a type 8139-000-02 Directional Wideband Transceiver available from Sonardyne International Limited, UK. This allows the procedure for data acquisition to be changed if desired and to upload data for processing before the data acquisition and storage module 406 is retrieved by an ROV.

Of course, if an ROV is available to communicate with the telemetry transceiver associated with the buoyancy can, assuming the ROV is equipped with a counterpart telemetry transceiver and associated communications apparatus, the telemetry data stored by the data acquisition and storage module 406 can be communicated using the part of the communications link associated with the subsea part of the subsea monitoring system 400.

In operation, during a measurement cycle, the USBL transceiver module 302 interrogates each of the first, second and third beacon transponders 110, 112, 114 and processes the replies received by the multiple elements of the receive array of the USBL transceiver module 302. The processed data from each beacon transponder is in the form of two angles (constituting angle data) and a range or range-related data, for example time-of-flight data. When replies from three or more transponders are processed together, the subsea measurement system 300 can estimate position in three axes and attitude in three axes (roll, pitch and heading), which are examples of location-related parameters. There is also redundant information available to estimate bias errors in the system.

Although not shown in FIG. 4, the USBL transceiver module 302 can optionally comprise sensors, for example an inclinometer, such as a dual-axis inclinometer, a temperature sensor and/or a depth sensor. In this example, any optional sensors can be disposed in the data acquisition and storage module 406 or the USBL transceiver module 302. Additionally, as accelerations at the base of the buoyancy can be less than at the top of the buoyancy can, in this example, any optional sensors are mounted in the housing of the USBL transceiver module 302. Additionally, or alternatively, the subsea measurement system can include other measurement devices, for example: a water current measurement device, such as a single point measurement device (for example a Seaguard® current meter available from Aanderaa Data Instruments AS, Norway) or a Doppler Velocity Log module (for example an apparatus from the Workhorse range of Acoustic Doppler Current Profilers available from Teledyne RD Instruments, Inc., USA). Attitude sensors are not required as attitude can be deduced from the acoustic measurements made above.

Although, in this example, three beacon transponders have been employed, the skilled person should appreciate that a greater or smaller number of beacon transponders can be employed, for example four beacon transponders, in order to increase accuracy.

Advantageously, the subsea monitoring system 300 provides a relatively low cost way of monitoring the motion of the buoyancy can 102, whilst minimising energy consumption, thereby prolonging battery life. Furthermore, it is possible to determine accurately both attitude and position of the buoyancy can 102 from the acoustic measurements made, as well as high quality velocity, acceleration, roll, pitch and heading data. Even in deep water, the system can achieve update rates of between about 0.1 Hz and about 1 Hz and no prior assumption is required as to the nature of the motions of the buoyancy can 102. In relation to the update rate, the use of a Kalman filter increases the update rate.

In yet another embodiment (FIG. 5), a hybrid subsea measurement system 500 is employed. In this respect, the subsea measurement system 500 is a combination of an inertial navigation system and the acoustic measurement system described above in relation to the preceding embodiments employing, for example, an LBL or USBL technique.

In this example, the subsea measurement system 500 again comprises the Ultra-Short Base Line (USBL) transceiver module 302 coupled to a side of the buoyancy can (not shown in FIG. 5) and constituting an acoustic communications module. The USBL acoustic transceiver 302 is positioned close to or towards the base of the buoyancy can in order to provide line-of-sight to all seabed transponders and avoid adverse acoustic performance caused by reflections from walls of the buoyancy can 102.

In common with the previous embodiment, the USBL transceiver module 302 is a combination of an acoustic transceiver and an USBL receive array, for example a low power USBL transceiver module available from Sonardyne International Limited, UK. In this example, the USBL receive array is a plurality of spaced hydrophones. The USBL transceiver module 302 is a low power USBL transceiver module that comprises a mid-range Digital Signal Processor (DSP) processor, which uses little more energy than a single channel receiver.

A battery module 404 is provided and coupled to a data acquisition and storage module 406. The data acquisition and storage module 406 constitutes a processing resource and is coupled to the USBL transceiver module 302. In this example, the data acquisition and storage module 406 has a system control function comprising pre-programmed procedures that power the various sensors and drives them to acquire the data which is logged into memory of the data acquisition and storage module 406.

The data acquisition and storage module 406 is also coupled to an inertial navigation system module 502, for example a Lodestar AHRS/AAINS system available from Sonardyne International Limited, UK. The inertial navigation system 502 is coupled to a Doppler Velocity Log (DVL) module 504, for example an apparatus from the Workhorse range of Acoustic Doppler Current Profilers available from Teledyne RD Instruments, Inc., USA. Advantageously, the DVL module 504 has an output that can be used as an input for an INS algorithm implemented by the inertial navigation system module 502, thus contributing towards the accuracy of the subsea measurement system 500. Additionally or alternatively, the DVL module can be use to determine a velocity vector thereof, which can be used to reduce the frequency of acoustic measurements required to maintain accuracy, thereby reducing overall system power consumption and/or enabling the use of lower power and lower cost inertial sensors.

Whilst it is beneficial to dispose the USBL transceiver module 302 at the base of the buoyancy can, it is beneficial to dispose the inertial navigation system module 502 on or towards the top of the buoyancy can where it is easier to maintain and can monitor larger accelerations. In this example, a cable is therefore routed from the data acquisition and storage module 406 to the USBL transceiver module 302.

On the seabed 108 or a permanent fixture of the sea floor, as in relation to the previous embodiments, the first beacon transponder 110 is located at the first known location, the second beacon transponder 112 is located at the second known location, and the third beacon transponder 114 is located at the third known location. The first, second and third beacon transponders 110, 112, 114 constitute reference beacons. In this regard, any suitable calibration technique can be employed to determine the locations of the first, second and third beacon transponders 110, 112, 114. In order to avoid unintentional displacement and facilitate replacement of the first, second and third beacon transponders 110, 112, 114, the first beacon transponder 110 is removably disposed in the first transponder frame 116, the second beacon transponder 112 is removably disposed in the second transponder frame 118, and the third beacon transponder 114 is removably disposed in the third transponder frame 120. In this example, the first, second and third beacon transponders 110, 112, 114 are wideband transponders, for example Type 8159 Wideband Transponders available from Sonardyne International Limited. The first, second and third transponder frames 116, 118, 120 can be any suitable transponder frames, for example a 10842-001 type frame available from Sonardyne International Limited.

The beacon transponders 110, 112, 114 are mounted in the frames to avoid unintentional displacement of the beacon transponders 110, 112, 114 and easy replacement thereof, for example replacement by the ROV. Similarly, the USBL transceiver module 302 can be recovered by the ROV and replaced with a spare USBL transceiver module 302 in order to access the data stored by the USBL transceiver module 302.

In order to communicate telemetry data from the subsea part of the subsea monitoring system 500 to a Floating Production, Storage and Offloading (FPSO) vessel, the subsea part of the subsea monitoring system 500 can comprise a first part of a robust spread spectrum or high speed acoustic telemetry link and the FPSO vessel can comprise a second part of the link, in a like manner to that described above in relation to FIG. 4. A suitable transceiver is a type 8139-000-02 Directional Wideband Transceiver available from Sonardyne International Limited, UK. This allows the procedure for data acquisition to be changed if desired and to upload data for processing before the data acquisition and storage module 406 is retrieved by an ROV. If more than one data acquisition and storage module is employed, separate telemetry transceivers can be employed for each data acquisition and storage module as will be described later herein in relation to FIG. 6.

Of course, if an ROV is available to communicate with the telemetry transceiver associated with the buoyancy can, assuming the ROV is equipped with a counterpart telemetry transceiver and associated communications apparatus, the telemetry data stored by the data acquisition and storage module 406 can be communicated using the part of the communications link associated with the subsea part of the subsea monitoring system 500.

In operation, during a measurement cycle, the USBL transceiver module 302 interrogates each of the first, second and third beacon transponders 110, 112, 114 and processes the replies received by the multiple elements of the receive array of the USBL transceiver module 302. The processed data from each beacon transponder is in the form of two angles (constituting angle data) and a range or range-related data, for example time-of-flight data. When replies from three or more transponders are processed together, the subsea measurement system 300 can estimate position in three axes and attitude in three axes (roll, pitch and heading), which are examples of location-related parameters. There is also redundant information available to estimate bias errors in the system.

In this example, the INS generates position and attitude data at a frequency of at least 10 Hz, for example less than 100 Hz. However, in this example, the inertial navigation system module 502 is "run" on an intermittent basis with a period of about 30 minutes for inertial data generation.

The generation of the inertial data is substantially in synchronism, for example within 1 ms, with the acoustic data obtained and an association with the acoustic data obtained is recorded, thereby "fusing" the inertial data with LBL or USBL data collected and improving the quality of the inertial data such that it is better than the acoustic data alone, even at update rates as low as about 0.1 or about 0.05 Hz. The inertial data can be used during, for example, post-processing in order to determine position and attitude of, for example, the buoyancy can. The acoustic data collected is also used during the post-processing in order to correct for errors in position and attitude data calculated when using the inertial data. Consequently, estimates of the attitude are virtually free of bias error.

Indeed, collection of the inertial data on an occasional basis is useful to provide very high quality data to characterize the motion of the buoyancy can and to estimate any bias errors in attitude estimates derived by the acoustic component of the subsea measurement system alone.

The DVL module 504 is, in this example, optional, although use thereof allows estimation of a current vector in relation to the buoyancy can with respect to the seabed 108.

Advantageously, the subsea monitoring system 500 is capable of generating high quality velocity, acceleration, roll, pitch and heading data. Also, the system can achieve update rates of about 10 Hz or greater. Furthermore, in respect of the inertial measurement data, the acquisition of the acoustic data provides so-called "incontrovertible truth" data and no prior assumption is required as to the nature or spectrum of the motions of the buoyancy can 102.

Figure 5:
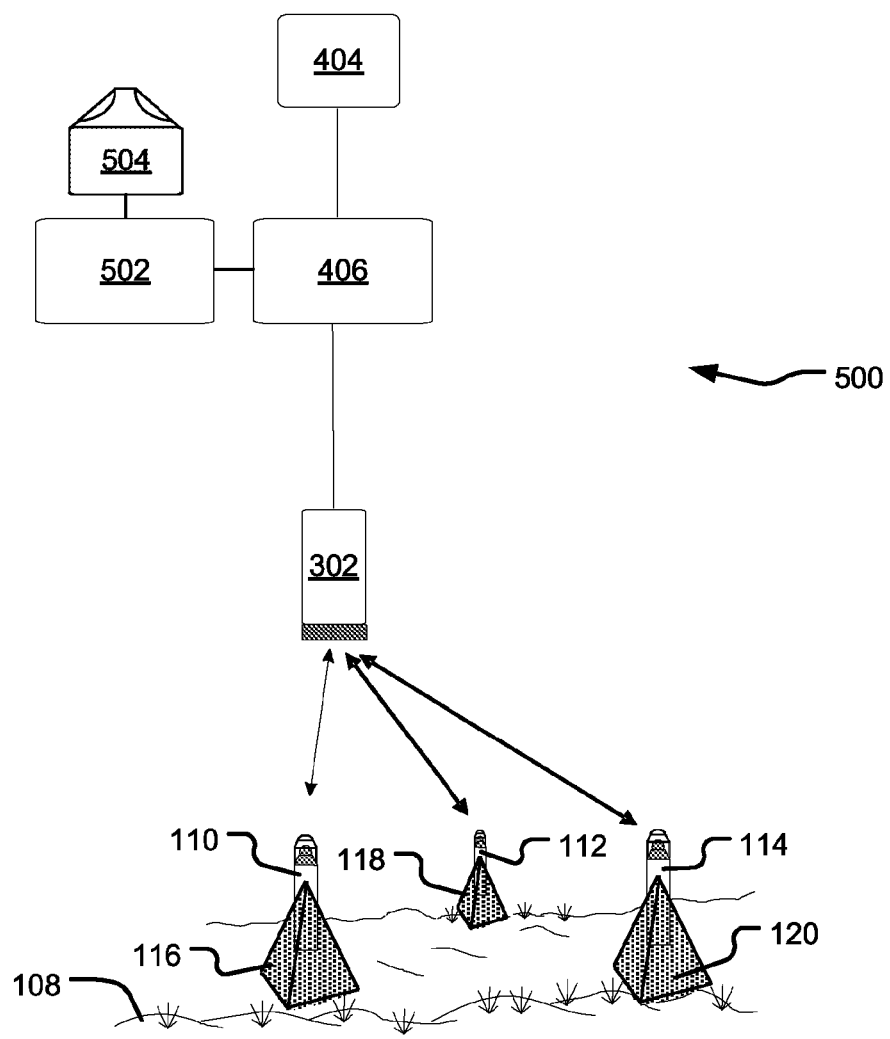
FIG. 5 is a schematic diagram of a hybrid subsea monitoring system constituting a fifth embodiment of the invention.

Although not shown in FIG. 5, the USBL transceiver module 302 can optionally comprise sensors, for example an inclinometer, a pressure sensor, a temperature sensor and/or a depth sensor.

In this regard, the pressure sensor can provide data concerning the movement of the buoyancy can in the vertical axis to an accuracy of, for example, about 3 cm, by virtue of a high accuracy strain gauge sensor employed. The inclinometer can provide information concerning the tilt of the buoyancy can, for example to an accuracy of about 0.05 degrees. However, as mentioned previously, inclinometers are subject to errors caused by accelerations of the buoyancy can, which are likely to introduce an error of about 0.1 degrees. By post processing the acoustic data to determine the accelerations at the time of an inclinometer measurement, some of this error can be removed. In this example, any optional sensors can be disposed in the data acquisition and storage module 406 in the USBL transceiver module 302. However, as accelerations at the base of the buoyancy can be less than at the top of the buoyancy can, in this example, any optional sensors are mounted in the housing of the USBL transceiver module 302.

Although optional use of the Doppler Velocity Log module 504 has been described herein, the skilled person should appreciate that other types of current measurement apparatus can optionally be employed, for example a single point measurement device, such as an Seaguard® current meter available from Aanderaa Data Instruments AS, Norway. Attitude sensors are not required as attitude can be deduced from the acoustic measurements made above.

Figure 6:
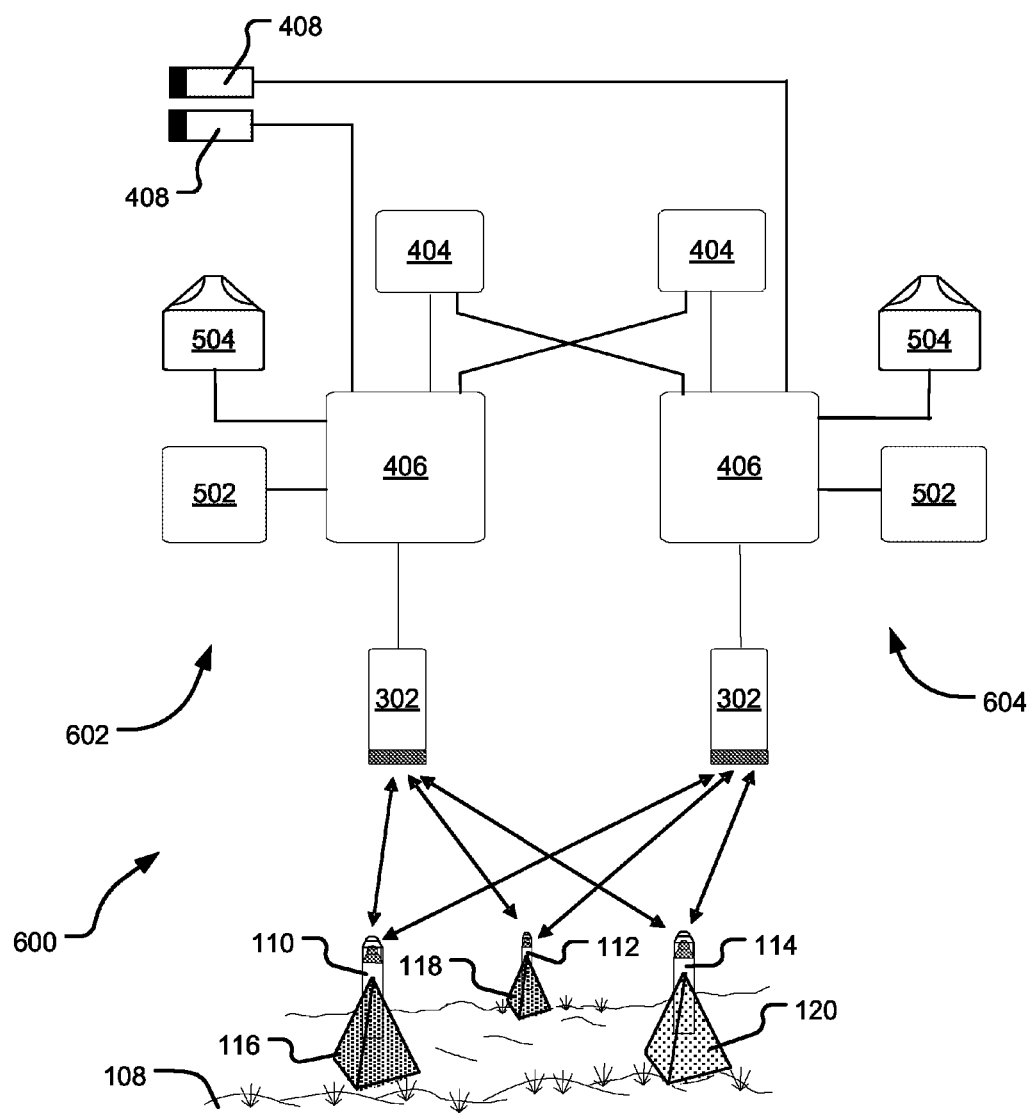
FIG. 6 is a schematic diagram of a hybrid subsea monitoring system incorporating redundancy and constituting a sixth embodiment of the invention.

Turning to FIG. 6, in yet a further embodiment of the invention, the hybrid subsea measurement system 500 of FIG. 5 is augmented by incorporating redundancy into the system. Hence, a redundancy supporting subsea measurement system 600 comprises a first hybrid subsea communication system 602 of a like structure to the hybrid subsea measurement system 500 of FIG. 5 and a second hybrid subsea communication system 604 of a like structure to the hybrid subsea measurement system 500, the second hybrid subsea measurement system 604 serving to provide redundancy. In this example, the respective battery modules 404 of the first and second hybrid subsea measurement systems 602, 604 are cross-coupled to their neighbouring data acquisition and storage module 406 as well as being coupled to their own respective data acquisition and storage module 406. Such coupling to the battery modules 404 also facilitates operation whilst certain modules are changed out by the ROV.

Again, on the seabed 108 or a permanent fixture of the sea floor, as in relation to the previous embodiment, the first beacon transponder 110 is located at the first known location, the second beacon transponder 112 is located at the second known location, and the third beacon transponder 114 is located at the third known location. The first, second and third beacon transponders 110, 112, 114 constitute reference beacons. In this regard, any suitable calibration technique can be employed to determine the locations of the first, second and third beacon transponders 110, 112, 114. In order to avoid unintentional displacement and facilitate replacement of the first, second and third beacon transponders 110, 112, 114, the first beacon transponder 110 is removably disposed in the first transponder frame 116, the second beacon transponder 112 is removably disposed in the second transponder frame 118, and the third beacon transponder 114 is removably disposed in the third transponder frame 120. In this example, the first, second and third beacon transponders 110, 112, 114 are wideband transponders, for example Type 8159 Wideband Transponders available from Sonardyne International Limited. The first, second and third transponder frames 116, 118, 120 can be any suitable transponder frames, for example a 10842-001 type frame available from Sonardyne International Limited.

The beacon transponders 110, 112, 114 are mounted in the frames to avoid unintentional displacement of the beacon transponders 110, 112, 114 and easy replacement thereof, for example replacement by the ROV. Similarly, the USBL transceiver module 302 can be recovered by the ROV and replaced with a spare USBL transceiver module 302 in order to access the data stored by the USBL transceiver module 302.

In order to communicate telemetry data from the subsea part of the subsea monitoring system 500 to a Floating Production, Storage and Offloading (FPSO) vessel, the subsea part of the subsea monitoring system 500 can comprise a first part of a robust spread spectrum or high speed acoustic telemetry link and the FPSO vessel can comprise a second part of the link, in a like manner to that described above in relation to FIG. 4. A suitable transceiver is a type 8139-000-02 Directional Wideband Transceiver available from Sonardyne International Limited, UK. This allows the procedure for data acquisition to be changed if desired and to upload data for processing before the data acquisition and storage module 406 is retrieved by the ROV. As more than one data acquisition and storage module is employed, separate respective telemetry transceivers 408 are employed for each data acquisition and storage module 406.

Of course, if an ROV is available to communicate with the telemetry transceivers 408 associated with the buoyancy can, assuming the ROV is equipped with a counterpart telemetry transceiver and associated communications apparatus, the telemetry data stored by the data acquisition and storage module 406 can be communicated using the part of the communications link associated with the subsea part of the subsea monitoring system 500.

In this example, the data acquisition and storage module 406 has a system control function comprising pre-programmed procedures that power the various sensors and drives them to acquire the data which is logged into memory of the data acquisition and storage module 406.

In operation, it should be appreciated that each of the first and second hybrid subsea communication systems 602, 604 operate independently in a like manner to that described above in relation to FIG. 5. Consequently, for the sake of conciseness of description and so as not to distract from the teachings of the embodiments herein, the operation of the redundancy equipped subsea measurement system 600 will not be described in further detail herein.

In any of the above embodiments, data recorded by transceiver modules or data acquisition and storage modules is post-processed in order to derive the parameters required by mechanical system analysts concerning, for example, motion of the buoyancy can. In this regard, the data acquired can be post processed by a computer coupled to a mass data storage device, constituting a further processing resource. The further processing resource can be provided in a marine vessel or a land-based facility.

In relation to the embodiments described above comprising the USBL module, it should be appreciated that although a single USBL module is described, a greater number of USBL modules can be employed, for example two USBL modules.

It should be appreciated that whilst various embodiments of the present invention have heretofore been described, the scope of the present invention should not be interpreted as being limited to the particular arrangements set out herein and, instead, extends to embrace all arrangements, modifications and alterations thereto, which fall within the scope of the appended claims.

The invention claimed is:

1. A subsea measurement system comprising:
   a first reference beacon disposed at a first known location;
   a second reference beacon disposed at a second known location;
   a third reference beacon (114) disposed at a third known location, the first, second and third known locations having a common reference frame associated therewith; and
   a USBL acoustic communications module for coupling to a subsea element to be monitored, the USBL acoustic communications module being capable of moving, when in use, relative to the first reference beacon, the second reference beacon and the third reference beacon; wherein
   the USBL acoustic communications module is disposed above the first, second and third reference beacons;
   the USBL acoustic communications module comprises a processing resource and is arranged to determine first range-related data to the first reference beacon in response to receipt of a first signal by the USBL acoustic communications module from the first reference beacon, second range-related data to the second reference beacon in response to receipt by the USBL acoustic communications module of a second signal from the second reference beacon), and third range-related data to the third reference beacon in response to receipt by the acoustic communications module of a third signal from the third reference beacon;
   the USBL acoustic communications module is further arranged to determine first angle data to the first reference beacon in response to receipt of the first signal by the USBL acoustic communications module from the first reference beacon, the first angle data comprising a first angular component and a second angular component, and second angle data to the second reference beacon in response to receipt of the second signal by the USBL acoustic communication module from the second reference beacon, the second angle data comprising a third angular component and a fourth angular component; and
   further comprising a further processing resource arranged to calculate at least one location-related parameter for the subsea element to be monitored comprising an estimated position and an estimated attitude of the USBL acoustic communications module in a local reference frame, the estimated position and the estimated attitude being in three axes, respectively, using the first, second and third range-related data and the first and second angle data, respectively.

2. The system according to claim 1, wherein the first angle data comprises a first direction cosine angle and a second direction cosine angle and/or the second angle data comprises a third direction cosine angle and a fourth direction cosine angle.

3. The system according to claim 1, further comprising:
   another acoustic communications module for coupling to the subsea element to be monitored, the another acoustic communications module being capable of moving, when in use, relative to the first reference beacon and the second reference beacon; wherein
   the another acoustic communications module comprises another processing resource and is arranged to determine fourth range-related data to the first reference beacon in response to receipt of the first signal by the another acoustic communications module from the first reference beacon and fifth range-related data to the second reference beacon in response to receipt by the another acoustic communication module of the second signal from the second reference beacon.

4. The system according to claim 3, wherein the another acoustic communications module is further arranged to determine third angle data to the first reference beacon in response to receipt of the first signal by the USBL acoustic communications module from the first reference beacon and fourth angle data to the second reference beacon in response to receipt by the acoustic communication module of the second signal from the second reference beacon.

5. The system according to claim 4, wherein the third angle data comprises a fifth direction cosine angle and a sixth direction cosine angle and/or the fourth angle data comprises a seventh direction cosine angle and an eighth direction cosine angle.

6. The system according to claim 1, wherein the three dimensions of the estimated attitude comprises a heading associated with the USBL acoustic communications module.

7. The system according to claim 1, wherein the three dimensions of the estimated attitude comprises a roll and/or pitch associated with the acoustic communications module.

8. The system as claimed in claim 1, wherein the acoustic communications module is arranged to determine fifth angle data to the third reference beacon in response to receipt of the third signal by the acoustic communications module from the third reference beacon.

9. The system according to claim 1, wherein the first beacon and the second beacon are respectively fixed at the first known location and the second known location.

10. The system according to claim 1, wherein the first beacon is a first transponder and the second beacon is a second transponder.

11. The system according to claim 1, wherein the first beacon is removably mounted in a first mount and/or the second beacon is removably mounted in a second mount.

12. The subsea measurement system according to claim 1, further comprising a free standing hybrid rider (FSHR) apparatus.

13. The subsea measurement system according to claim 12, further comprising a constellation of free standing hybrid riser apparatus for coupling to a floating production storage and offloading (FPSO) vessel, the constellation of free standing hybrid riser apparatus comprising the free standing hybrid riser apparatus.

14. A method of determining a subsea location-related parameter, the method comprising:
 disposing a first reference beacon at a first known location; and
 disposing a second reference beacon at a second known location;
 disposing a third reference beacon at a third known location, the first, second and third known locations having a common reference frame associated therewith;
 providing a USBL acoustic communications module for coupling to a subsea element to be monitored, the USBL acoustic communications module being disposed above the first, second and third reference beacons and capable of moving relative to the first reference beacon, the second reference beacon and the third reference beacon; and
 determining first range-related data from the USBL acoustic communications module to the first reference beacon in response to receipt of a first signal by the USBL acoustic communications module from the first beacon, second range-related data from the USBL acoustic communications module to the second reference beacon in response to receipt by the USBL acoustic communications module of a second signal from the second reference beacon, and third range-related data from the USBL acoustic communications module to the third reference beacon in response to receipt of a third signal by the USBL acoustic communications module from the third reference beacon;
 determining first angle data to the first reference beacon in response to receipt of the first signal by the USBL acoustic communications module from the first reference beacon, the first angle data comprising a first angular component and a second angular component, and second angle data to the second reference beacon in response to receipt of the second signal by the USBL acoustic communication module from the second reference beacon, the second angle data comprising a third angular component and a fourth angular component; and
 calculating at least one location-related parameter for the subsea element to be monitored comprising an estimated position and an estimated attitude of the USBL acoustic communications module in a local reference frame, the estimated position and the estimated attitude being in three axes, respectively, using the first, second and third range-related data and the first and second angle data, respectively.

* * * * *